United States Patent
Mitamura (10) Patent No.: US 6,528,203 B1
(45) Date of Patent: Mar. 4, 2003

(54) STRUCTURE FOR A STRAP FOR PORTABLE ELECTRONIC EQUIPMENT

(75) Inventor: Gen Mitamura, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/549,358

(22) Filed: Apr. 14, 2000

(30) Foreign Application Priority Data

| Apr. 15, 1999 | (JP) | 11-108003 |
| Apr. 23, 1999 | (JP) | 11-116640 |
| Apr. 23, 1999 | (JP) | 11-116641 |
| Apr. 23, 1999 | (JP) | 11-116643 |

(51) Int. Cl.$^7$ ............................................. H01M 2/10
(52) U.S. Cl. .............................. 429/98; 429/99; 429/100
(58) Field of Search .............................. 429/96, 98, 99, 429/100

(56) References Cited

U.S. PATENT DOCUMENTS

| 4,147,838 A | * | 4/1979 | Leffingwell ................... 429/1 |
| 4,835,452 A | * | 5/1989 | Kuriyama ...................... 320/2 |
| 5,095,382 A | * | 3/1992 | Abe .............................. 359/189 |
| 5,155,659 A | * | 10/1992 | Kunert ......................... 220/375 |
| 5,194,857 A | * | 3/1993 | Gomez ........................ 340/7.63 |
| 5,305,181 A | * | 4/1994 | Schultz ....................... 345/168 |
| 5,308,717 A | * | 5/1994 | Gordin ........................... 429/99 |
| 5,587,577 A | * | 12/1996 | Schultz .................. 235/462.44 |
| 5,654,870 A | * | 8/1997 | Havener ....................... 361/600 |
| 5,766,801 A | * | 6/1998 | Inoue et al. ................... 429/99 |
| 5,883,492 A | * | 3/1999 | Koenck ....................... 320/107 |
| 5,890,780 A | * | 4/1999 | Tomiyori ...................... 307/86 |
| 6,007,940 A | * | 12/1999 | Spotnitz ....................... 429/99 |
| 6,036,093 A | * | 3/2000 | Schultz .................. 235/462.43 |
| 6,106,971 A | * | 8/2000 | Spotnitz ....................... 429/98 |
| 6,177,209 B1 | * | 1/2001 | Okutoh ......................... 429/62 |
| 6,217,339 B1 | * | 4/2001 | Tsubata ......................... 439/38 |
| 6,221,526 B1 | * | 4/2001 | Tanishita .................... 429/123 |

FOREIGN PATENT DOCUMENTS

| JP | 51010966 | 3/1976 |
| JP | 55116470 | 2/1979 |

* cited by examiner

*Primary Examiner*—Tom Dunn
*Assistant Examiner*—Zidia Pittman
(74) *Attorney, Agent, or Firm*—Adams & Wilks

(57) ABSTRACT

A strap for a wrist-wearable electronic device facilitates battery charging and the supply of electrical power to external devices. A housing for a battery is removably mounted to the center of a resin strap, and one or more batteries are lined up next to each other within the housing. The batteries and housing are curved to conform to the curvature of a user's wrist. A charging terminal for charging the batteries is provided and one or more output terminals for supplying electrical power to external devices are provided at four corners of the housing. The output voltages and diameters of the terminals are different and each terminal is provided with detachable resin covers. An overcharging prevention circuit is disposed between the charging terminal and an output terminal.

16 Claims, 12 Drawing Sheets

STRUCTURE FOR A STRAP FOR PORTABLE ELECTRONIC EQUIPMENT

FIELD OF THE INVENTION

This invention relates to a structure for a strap for portable electronic equipment used with equipment such as electronic equipment that requires a secondary battery, to a charging method and arrangements for terminals for a structure for a strap for portable electronic equipment, and to a way of improving the comfort with which worn parts fit.

This invention further relates to a structure for a strap for portable electronic equipment in which cost effectiveness and mounting are improved by providing a second battery mounting and a strap separately, and implementing a structure for a strap for portable electronic equipment where gas generated by the secondary battery is discharged to outside.

DESCRIPTION OF THE RELATED ART

Conventionally, various methods have been proposed in order to extend power supply life for electronic devices and other portable electronic equipment. With, for example, technology disclosed in Japanese Patent Publication Laid-open No. Sho. 52-84435, a secondary battery is built-into a watch body, power supply life is extended by locating a thermo-element generator in a watch strap, and the number of times a battery is changed is reduced. Further, Japanese Patent Publication Laid-open No. Hei. 1-73916, discloses a secondary battery built into a watch strap, and a connection made with a watch body at an end piece.

Further, in recent years, large power supply capacities have become necessary as multi-functionality of electronic devices such as wristwatches has advanced. However, housing a battery on a battery strap-side has been proposed because large batteries cannot be built into a watch body because of the relationship of the case dimensions. With, for example, the technology disclosed in Japanese Utility Model Laid-open Publication No. Sho. 56-94982, a large capacity battery is housed in an end piece of a watch strap.

Still further, with technology disclosed in Japanese Utility Model Laid-open Publication No. Sho. 56-94982, housing a large capacity battery in the end piece of the watch strap restrains the extent to which the watch body can be made large.

However, with related electronic devices there is the problem that the size of the watch body becomes large due to storing a secondary battery in the watch body, and it has therefore been difficult to make the capacity of a secondary battery large. Charging from outside has also been problematic because the secondary battery is housed in the watch body. On the other hand, when a large capacity battery is housed in a watch strap, the supply of electrical power to equipment other than the watch cannot be achieved because the connection with the watch body is carried out at the end piece portion. In recent years, in addition to electronic devices portable electronic equipment such as portable telephones, pocket-sized games, and compact personal computers, etc. have become widespread and it would be useful to be able to provide electrical power to such equipment.

Next, the secondary battery becomes larger as larger power supply capacity is demanded so that even if this battery is housed in a watch strap, the watch will be difficult to fit on a persons wrist and will feel uncomfortable when worn. This is particularly conspicuous when used by a user with narrow wrists. In Utility Model Laid-open Publication No. Sho 58-88185, there is disclosed a paper battery housed in a watch strap but this is not employed as a secondary battery and furthermore, power supply capacity is insufficient for use as a secondary battery. It is therefore an object of this invention to provide a structure for a strap for portable electronic equipment where a large power supply capacity is maintained while providing a superior fit.

With the aforementioned related electronic devices consideration has not been given to changing a battery when a battery or secondary battery is housed in a watch strap. Further, when a large battery is housed in a watch strap, part of the watchstrap becomes large and the feeling when worn is not good. The object of the invention is to provide a structure for a strap for portable electronic equipment where battery changing is simple and which feels extremely comfortable when worn.

Further, secondary batteries of related electronic devices are housed in an airtight manner in order to prevent the infiltration of dust and sweat. However, minute amounts of gas are generated during charging by electrode agents used in secondary batteries such as lithium batteries, etc. Gas therefore accumulates at portions housing secondary batteries and the strap may therefore become deformed. It is therefore a further object of this invention to provide a structure for a strap for portable electronic equipment capable of effectively preventing deformation due to accumulation of gas.

SUMMARY OF THE INVENTION

In order to achieve the aforementioned object, in this invention, a secondary battery is housed in part of a strap and a charging terminal connected to this secondary battery is provided in the strap. By providing not only a charging terminal but also an output terminal, the supplying of electrical power to other electronic equipment is made possible. A dual-purpose input/output terminal can also be adopted as this charging terminal and output terminal. An overcharging prevention circuit is also provided in this invention in order to prevent overcharging while a charging operation is being performed from outside.

The range of compatible electronic equipment can also be broadened by changing over voltages outputted from the output terminal using a voltage changeover switch. It is also possible to provide a plurality of output terminals each outputting a different voltage, but it is preferable for the diameter of each terminal to be different in order to prevent erroneous connection to an output terminal of a different voltage. Further, as the charging terminal and output terminals are exposed, it is preferable to provide covers in order to prevent the infiltration of dust and sweat. In addition to typical electronic devices, this invention can also be applied to other portable electronic equipment that can be carried using a strap, such as, for example, Global Positioning Systems (GPS) and personal computers, and strap structures disclosed in the following embodiments can be employed in such cases.

In order to achieve the aforementioned objects, a plurality of secondary batteries are housed in part of a strap for carrying portable electronic equipment, the housing is curved, and the secondary batteries housed in the housing are curved. The whole strap is therefore curved as a result. In a further method, the housing is curved, and a curved secondary battery is housed within the housing. The entire strap can therefore be formed in a curved manner in this case in the same manner as described above. In addition to typical electronic devices, this invention can also be applied to other portable electronic equipment that can be carried using a strap, such as, for example, Global Positioning Systems (GPS) and personal computers. When the invention is employed with this equipment, the structure for the strap can be the same as disclosed for the following embodiments.

In order to achieve the aforementioned object, electrode wires are embedded in a strap and a plurality of slots that expose the surface of the electrode wires are provided. A battery housing provided separately from the strap is made detachable and electrode projections connecting with the battery are provided opposite the strap surface. The electrode projections make contact with the electrode wires so as to conduct while the battery housing is attached to the strap because the embedded electrode wires are exposed at the slots. As a plurality of slots are provided, the battery housing can be adjusted to a more comfortable position when worn. The strap and the battery housing are separate and are therefore changeable.

It is also possible to use electrode projections with pointed ends and not provide the slots. In this case, the battery housing can be adjusted to an appropriate position and the tips of the electrode projections then penetrate into the strap and conduct with the embedded electrode wires. The stage of adjusting the position of the battery housing can therefore be omitted with this configuration. In addition to typical electronic devices, this invention can also be applied to other portable electronic equipment that can be carried using a strap, such as, for example, Global Positioning Systems (GPS) and personal computers.

Further, in order to achieve the aforementioned object, in a structure for a strap for portable electronic equipment, a secondary battery is housed in part of a strap for carrying portable electronic equipment, and a gas release valve is provided in a secondary battery housing. Gas generated at the secondary battery is discharged to outside by opening the gas release valve and dust and sweat cannot infiltrate because the valve is closed. In addition to typical electronic devices, this invention can also be applied to other portable electronic equipment that can be carried using a strap, such as, for example, Global Positioning Systems (GPS) and personal computers.

DESCRIPTION OF THE PREFERRED EMBODIMENTS

The following is a detailed description of the present invention with reference to the drawings, with this invention by no means being limited to these embodiments.

First Embodiment

Figure 1A:
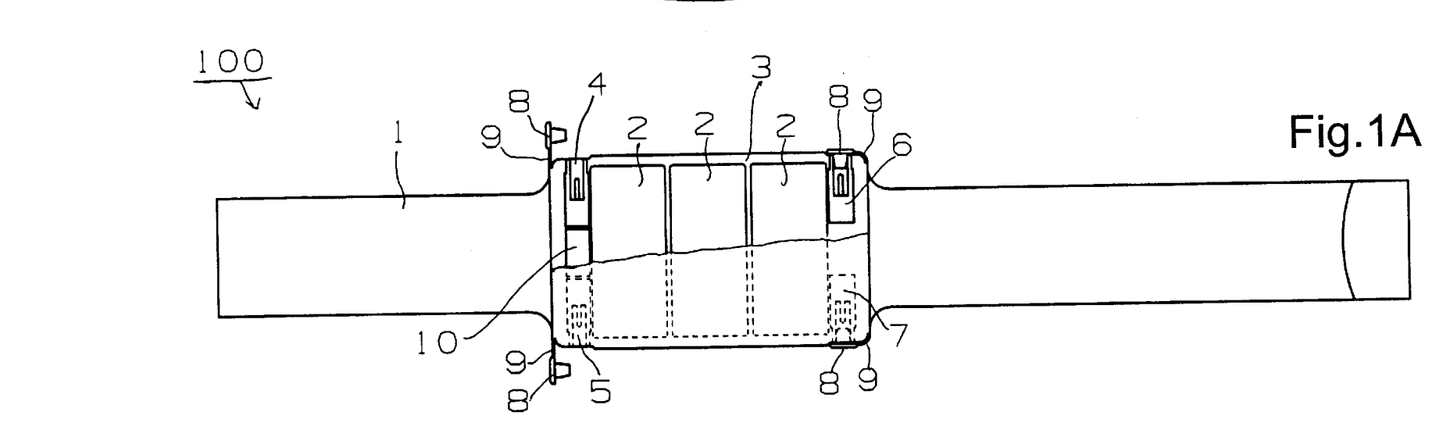
FIGS. 1A–1C schematically show structures for an electronic equipment strap of a first embodiment of this invention.
Figure 1B:
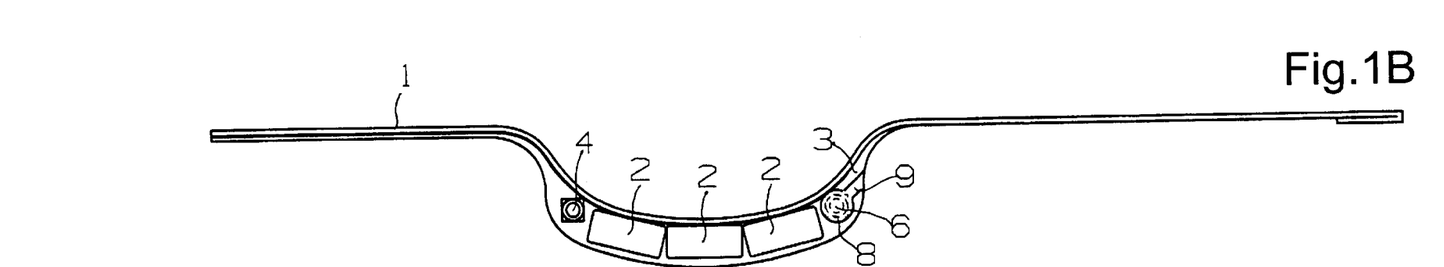
Figure 1C:
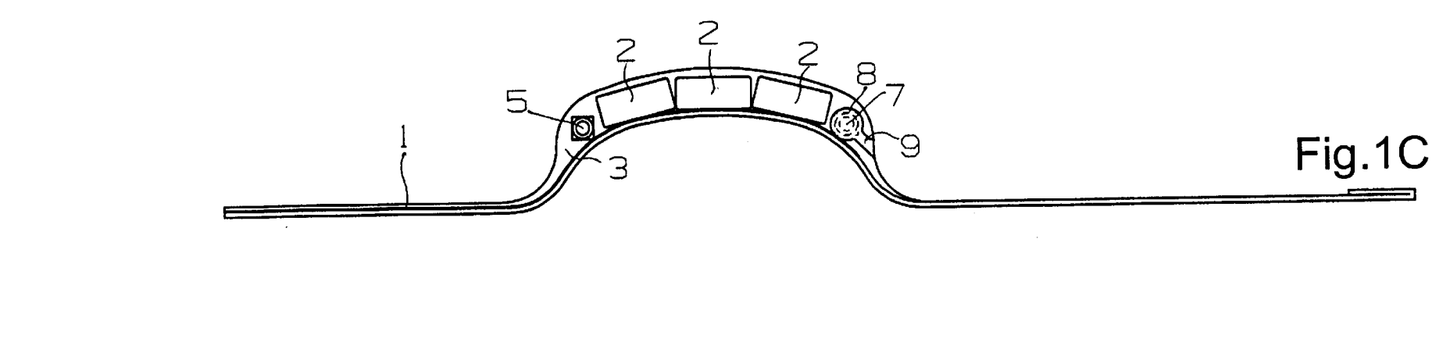

FIGS. 1A–1C schematically show a structure for an electronic equipment strap of a first embodiment of this invention, with FIG. 1A being a plan view, FIG. 1B being a side view, and FIG. 1C being a further side view. An electronic equipment body is omitted from the drawings. This strap structure 100 has a housing 3 for housing secondary batteries 2 at the center of a resin strap 1, and three secondary batteries 2 are lined up next to each other within the housing 3. The secondary batteries 2 are, for example, lithium ion batteries, nickel hydrogen batteries, or nickel cadmium batteries, etc. A charging terminal 4 for charging the secondary batteries 2, and three kinds of output terminal 5 to 7 for providing electric power to the outside are provided at the four corners of the housing 3 and are exposed to the outside of the strap 1. Output voltages of each of the output terminals 5 to 7 are different, with, for example, the first output terminal 5 being 1.2V, the second output terminal 6 being 2.4V, and the third output terminal 7 being 3.6V. The diameters of each of the output terminals 5 to 7 are also different in order to prevent external equipment being mistakenly connected to the wrong voltage. More specifically, the diameters of the first to third output terminals 5 to 7 become smaller, in that order.

Detachable resin covers 8 are provided for the charging terminal 4 and the output terminals 5 to 7. These covers 8 are connected by connectors 9 protruding from the vicinity of the container 3 in order to prevent the covers 8 from being lost. These covers 8 are formed integrally with the strap 1 and prevent dust and sweat from getting in through the terminal holes, as well as preventing short circuits with the outside. An overcharging prevention circuit 10 is also inserted between the charging terminal 4 and the first output terminal 5, and is constructed from diodes and transistors, etc. Connection terminals of an external transformer can also be inserted into the charging terminal 4 during charging.

According to this strap structure 100 for an electronic equipment, the secondary batteries 2 can be easily and rapidly charged from outside. The capacity of the secondary batteries 2 can also be made large as it is not necessary to consider the size of the watch body because the secondary batteries 2 are provided in the strap 1. It is also possible to provide electrical power to external portable electronic equipment because the output terminals 5 to 7 are provided.

Second Embodiment

Figure 2:
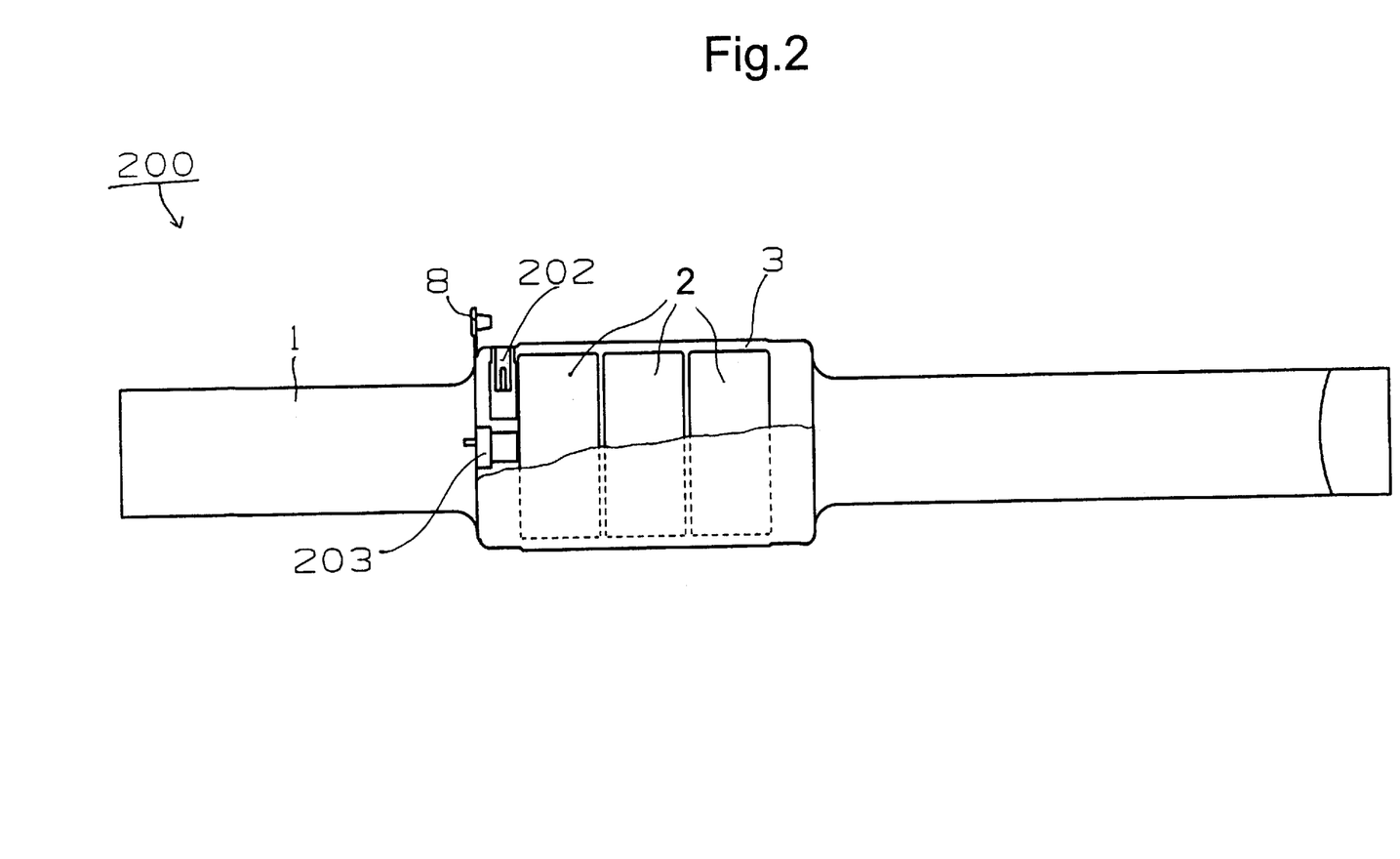
FIG. 2 schematically shows a structure for an electronic equipment strap of a second embodiment of this invention.

FIG. 2 schematically shows a structure for an electronic equipment strap of a second embodiment of this invention. In a strap structure 200 of this second embodiment, three secondary batteries 2 are housed in the housing 3 of the strap 1. The secondary batteries 2 are connected to a dual purpose input/output terminal 202 that functions as both a charging terminal and an output terminal. The input/output terminal 202 is sealed by a cover 8 formed integrally with the strap 1, and a voltage changeover switch 203 is provided in the vicinity of the input/output terminal 202. This voltage changeover switch 203 changes over the output voltage depending on the position which it is pushed into and is externally operated by the user. The voltage changeover switch 203 changes the output voltage by changing over the manner in which the three secondary batteries 2 are connected between series and parallel. Economies can therefore be made with regards to the number of parts and space by having a dual purpose terminal (the input/output terminal 202) that doubles as both a charging terminal and an output terminal. An overcharging prevention circuit can also be provided at the strap structure 200 and the terminal may be employed as a charging terminal and an output terminal rather than an input/output terminal.

Third Embodiment

Figure 3A:
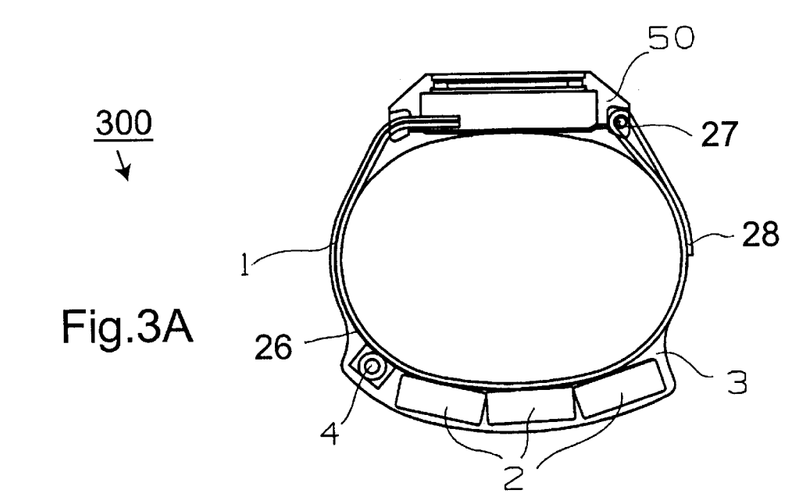
FIGS. 3A–3B schematically show structures for an electronic equipment strap of a third embodiment of this invention.
Figure 3B:
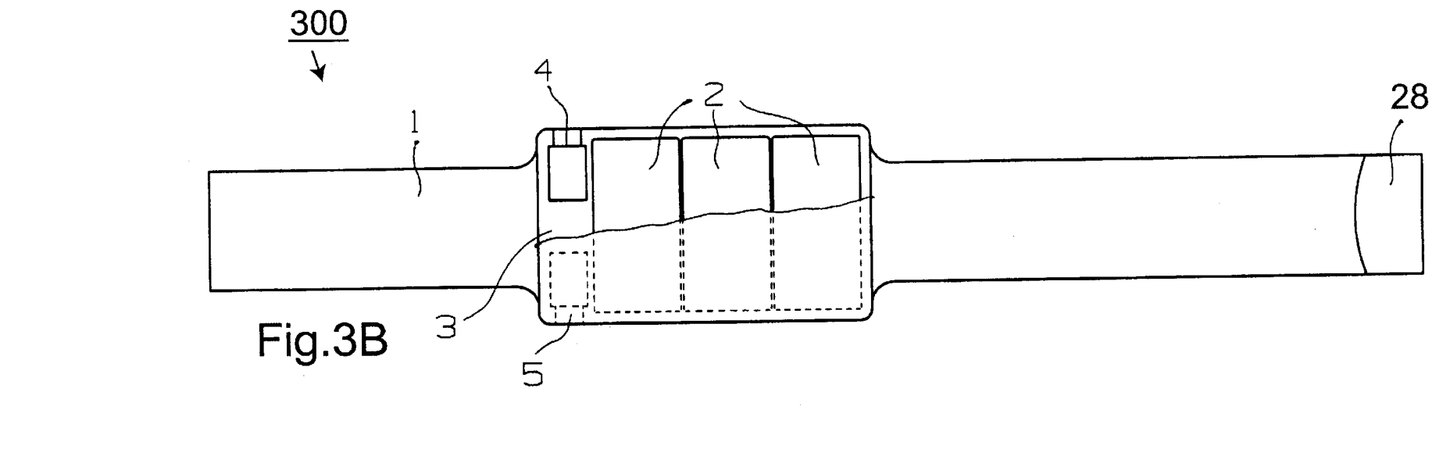

FIGS. 3A–3B schematically show structure for an electronic equipment strap of a third embodiment of this invention, with FIG. 3A being a side view and FIG. 3B being a plan view. This strap structure 300 has a housing 3 for secondary batteries 2 at the center of a resin strap 1, with three secondary batteries 2 being arranged in a curved manner within the housing 3. The housing 3 is curved to an extent to fit onto the wrist of an average user. The secondary batteries 2 are, for example, lithium ion batteries, nickel hydrogen batteries, or nickel cadmium batteries, etc.

A charging terminal 4 for charging the secondary batteries 2, and an output terminal 5 for providing electric power to outside are provided at the housing 3 and are exposed to the outside of the strap 1. Conducting wire 26 for supplying electric power to a watch body 50 is provided within the strap 1. One end of the strap 1 is inserted into the watch body 50 and conducts internally with a circuit substrate (not shown). Magic tape 28 is provided at the other end of the strap 1, is passed through between the watch body 50 and a spring bar 27, folded back, and fixed. According to this strap structure 300 for an electronic equipment, by giving the housing 3 a curved shape, the feeling of the fit on the wrist can be improved while maintaining a substantial power supply capacity.

Fourth Embodiment

Figure 4A:
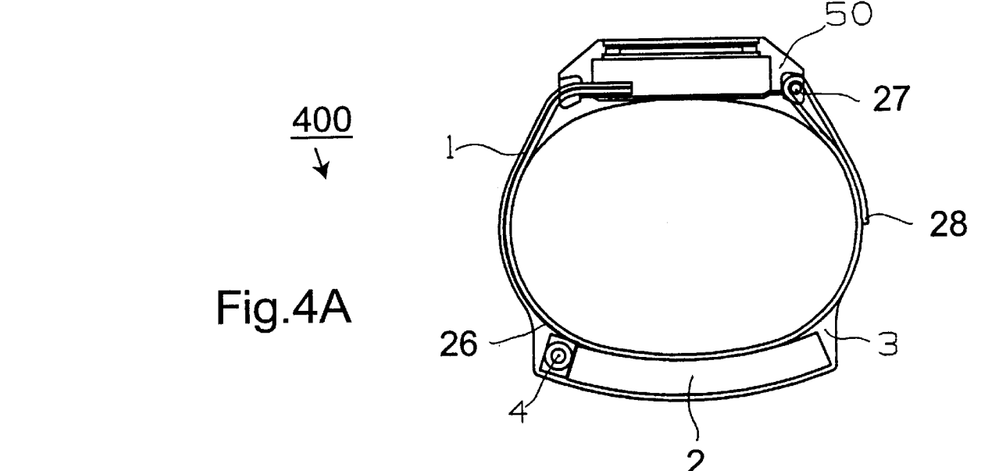
FIGS. 4A–4B schematically show structures for an electronic equipment strap of a fourth embodiment of this invention.
Figure 4B:
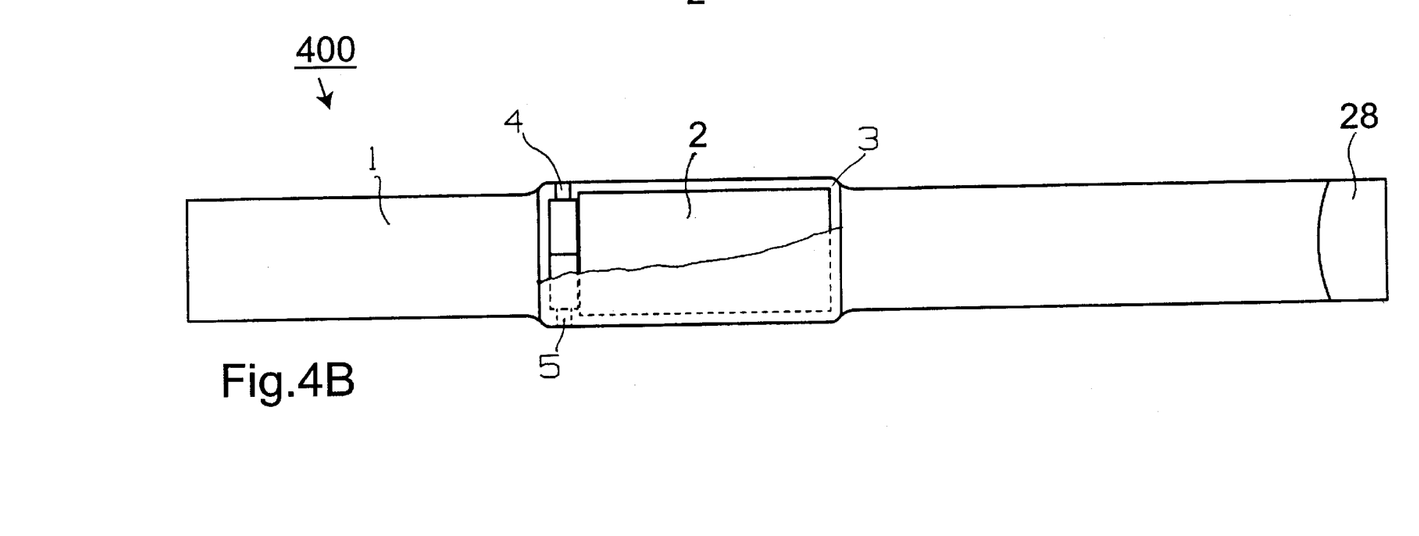

FIGS. 4A–4B schematically show structure for an electronic equipment strap of a fourth embodiment of this invention, with FIG. 4A being a side view and FIG. 4B being a plan view. A characteristic of the strap structure 400 of a fourth embodiment is that a curved secondary battery is employed. Other aspects of the configuration are the same as for the third embodiment, and a description thereof is therefore omitted. Here, a polymer battery that can be molded with a high degree of freedom is employed as the secondary battery 2. The feeling of the fit on the wrist can therefore also be improved with this structure while maintaining a substantial power supply capacity.

Fifth Embodiment

Figure 5A:
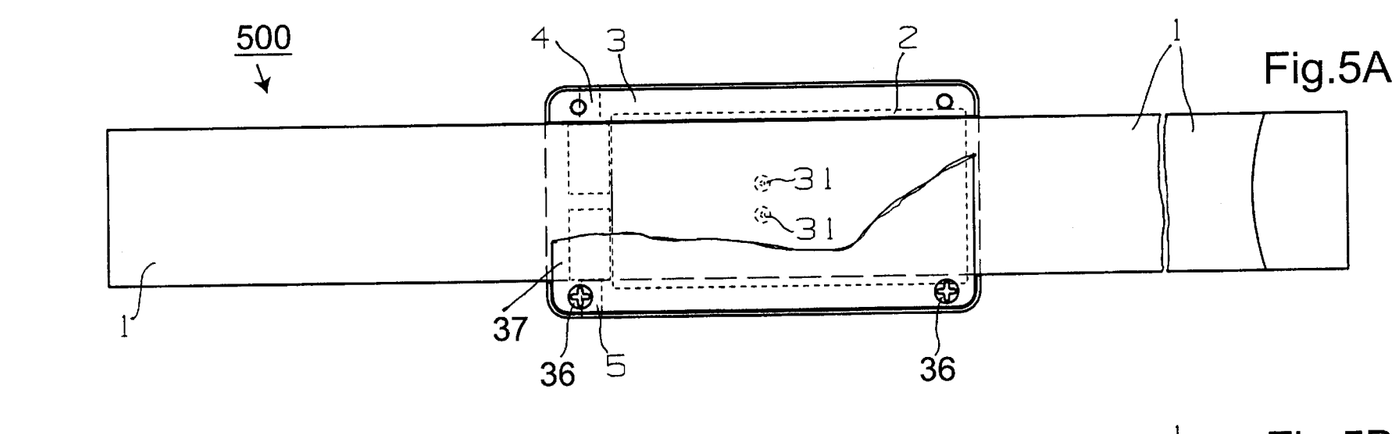
FIGS. 5A–5B schematically show structures for an electronic equipment strap of a fifth embodiment of this invention.
Figure 5B:
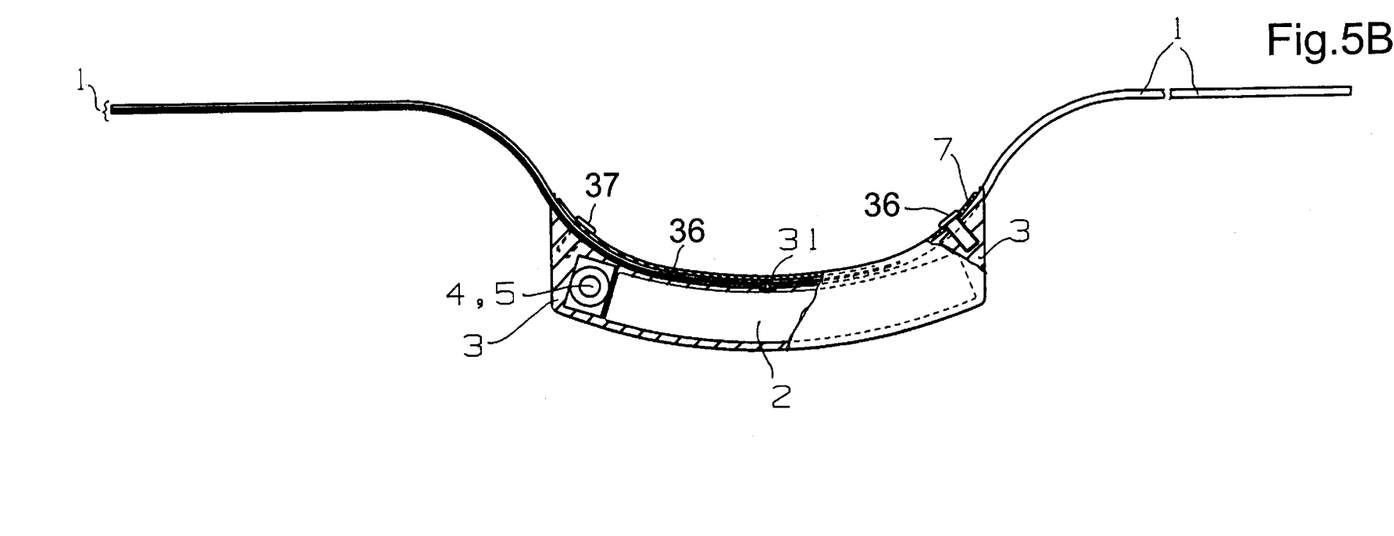

FIGS. 5A–5B are view showing a structure for an electronic equipment strap of a fifth embodiment of this invention, where FIG. 5A is a plan view and FIG. 5B is a side view. With this strap structure 500, the resin strap 1 and the housing 3 for the secondary battery 2 are separate. The housing 3 has an overall curved shape with the secondary battery 2 being embedded within the housing 3. The secondary batteries 2 are, for example, lithium ion batteries, nickel hydrogen batteries, or nickel cadmium batteries, etc. A charging terminal 4 for charging the secondary battery 2, and an output terminal 5 for providing electric power to the outside are provided at the housing 3 and are exposed to the outside of the strap 1.

Figure 6A:
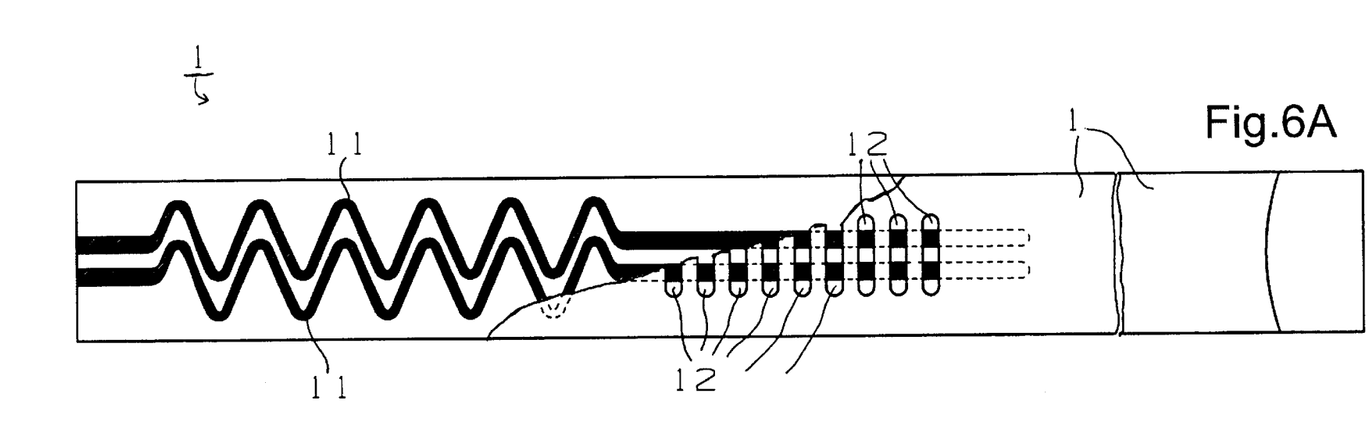
FIGS. 6A–6B are plan view showing the structures of the electronic equipment strap shown in FIGS. 5.
Figure 7A:
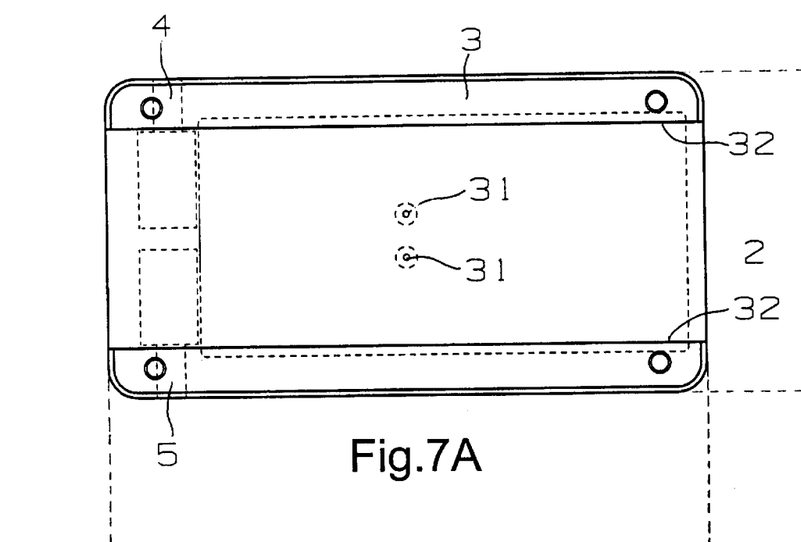
FIGS. 7A–7C are three plane view showing outlines of the structure for the battery housing shown in FIGS. 5.
Figure 7B:
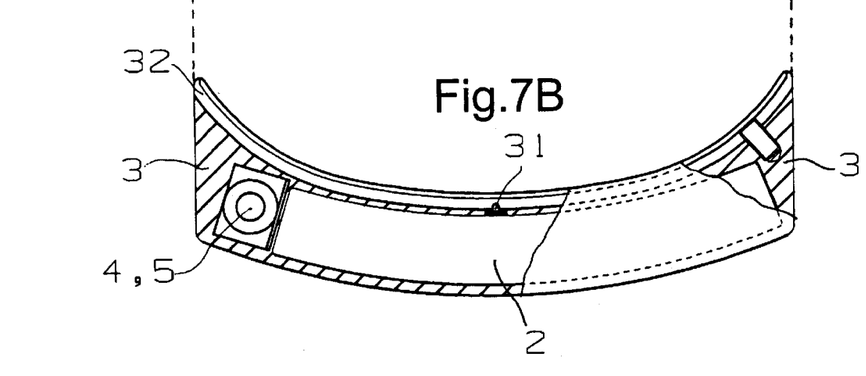
Figure 7C:
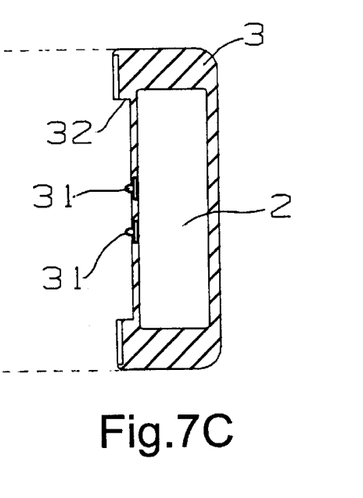

FIG. 6A is a plan view of a strap showing the fifth embodiment of the present invention. Two electrode wires 11 are embedded in parallel within the strap 1. The electrode wires 11 are wired in a rippled shape at the most curved portion of the strap 1. A plurality of slots 12 are provided at the surface of the strap 1 and the electrode wires 11 are exposed to the outside via these slots 12. On the other hand, electrode projections 31 exposed in the manner shown in FIG. 7 and coming into contact with the electrode wires 11 are provided at the housing 3. A charging terminal 4 for charging the secondary battery 2, and an output terminal 5 for providing electric power to the outside, are embedded at the housing 3. The terminals 4 and 5 are wired so as to have the same polarity as that of the electrode wires 11 and are exposed to the outside of the strap. The electrode projections connect with the positive and negative poles of the secondary battery 2 within the housing 3 (not shown). A slot 32 that the strap passes through is also provided at the housing 3. One end of the strap 1 then connects with the watch body so as to conduct with an internal circuit substrate (not shown).

Figure 8A:
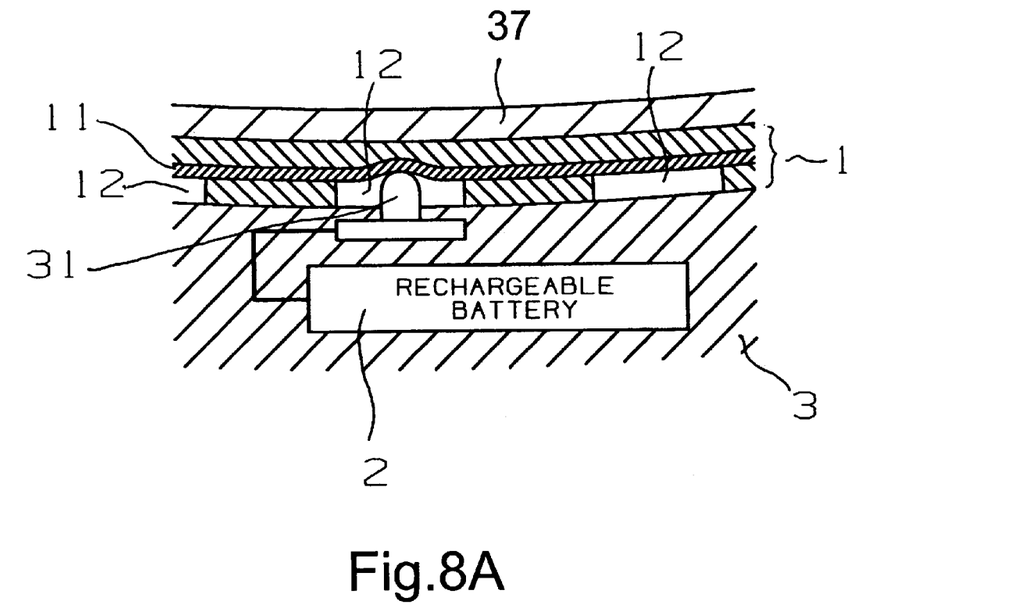
FIGS. 8A–8B are cross-sectional view showing an example structure for an electrode projection.
Figure 8B:
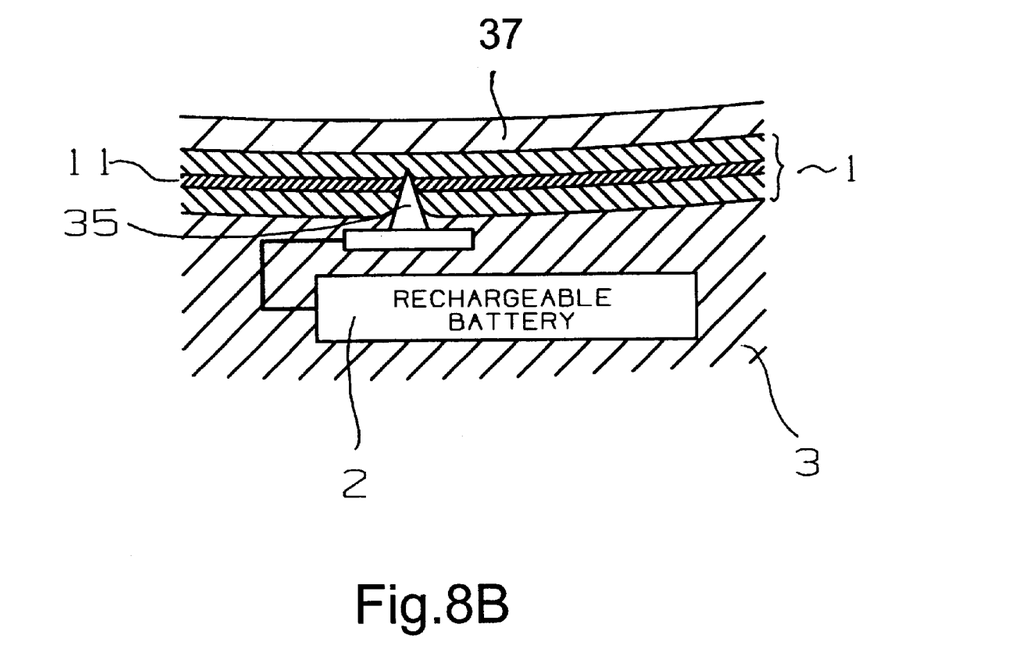

When connecting the strap 1 and the housing 3, the strap is first passed through the slot 32 and is positioned taking the positions of the slots 12 into consideration in a manner that ensures that the watch feels comfortable when worn. The electrode projections 31 of the housing 3 then fall into the slots 12 so as conduct with the electrode wires 11 (refer to FIG. 8A). Any structure is acceptable for the electrode projections, providing that the terminals connected to the secondary battery 2 are urged towards the electrode wires 11. For example, as shown in FIG. 8B, conduction can be achieved by sticking an electrode projection 35 with a pointed end into an electrode wire 11.

If conduction is achieved between the electrode wires 11 and the electrode projections 31, a rear cover 37 is fixed to the strap 1 using a mounting screw 36. The method of fixing is by no means limited to a screwing method, and a clamping method may also be employed. In order to make the structure waterproof, a seal is formed around the slots 12 so as to provide sealing using fastening pressure when fixing the strap 1 using screws. When the capacity of the secondary batteries is small, charging is carried out using a separately prepared charger (omitted from the drawings), and the charger can then be connected to the charging terminal 4 during charging.

According to the above strap structure 500 for an electronic equipment, by making the housing 3 and the strap 1 separate, only the secondary battery can easily be changed. The feeling of the watch when worn can also be improved by adjusting the position of the housing 3 and it is also possible to change the strap 1.

Sixth Embodiment

Figure 6B:
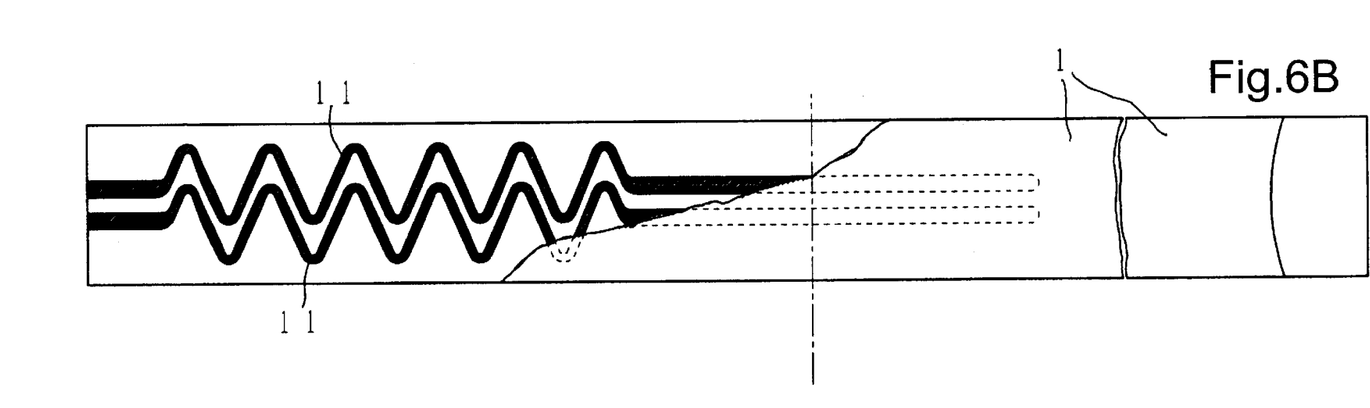

In the sixth embodiment, shown in FIG. 6B and FIG. 8B, electrode projections 35 with pointed ends are employed but the slots 12 are not formed in the strap 1. Conduction can then be achieved by the pointed ends of the electrode projections 35 penetrating directly into the strap 1. According to this structure, as shown in FIG. 6B and FIG. 8B, the stage of adjusting the position of the housing 3 is no longer carried out and manufacture is straightforward because the slots 12 are not formed. The above configuration is by no means limited to secondary batteries, and can also be used for primary batteries. Further, the embedded wires do not break even when the strap is bent because the wiring embedded within the strap is wired in a partially rippled manner.

Seventh Embodiment

Figure 9A:
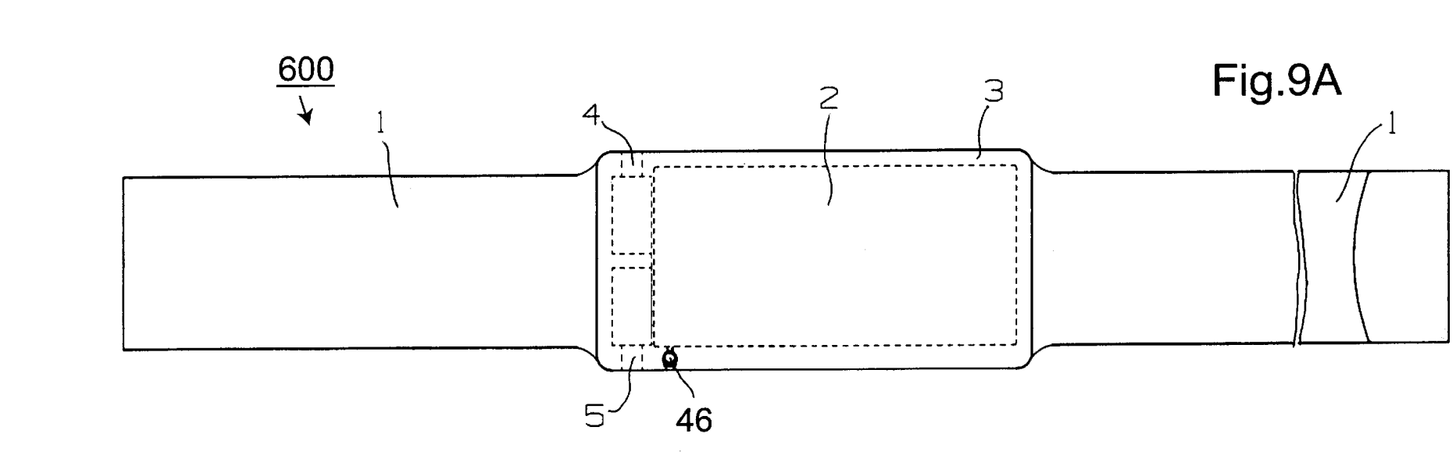
FIGS. 9A–9B are cross-sectional view showing structures for an electronic equipment strap of a seventh embodiment of this invention.
Figure 9B:
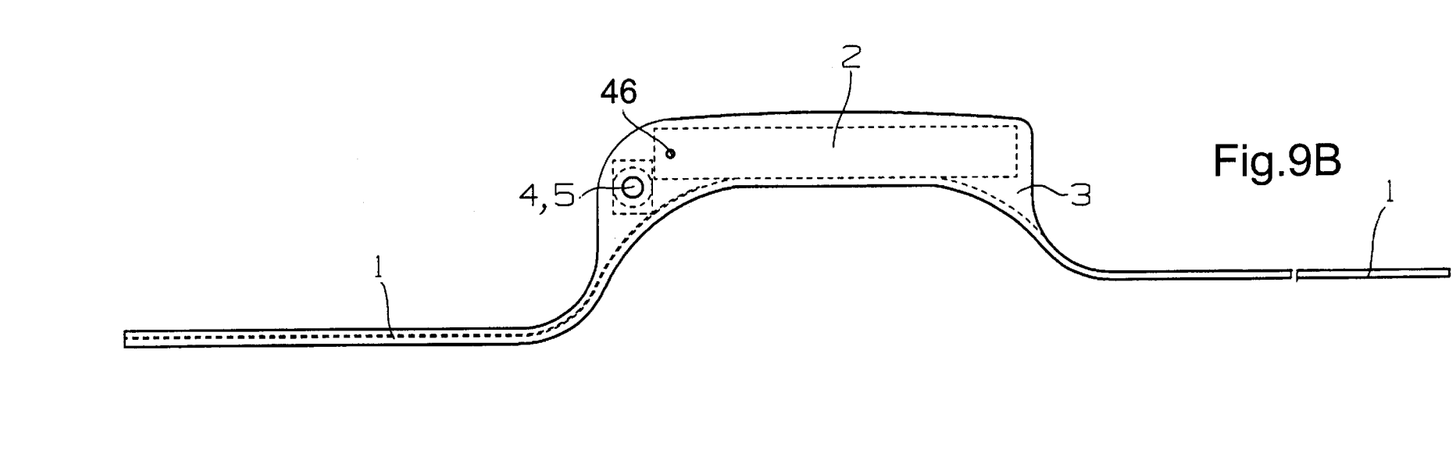

FIGS. 9A–9B are view showing a structure for an electronic equipment strap of a seventh embodiment of this invention, where FIG. 9A is a plan view and FIG. 9B is a side view. An electronic equipment body is omitted from the drawings. This strap structure 600 has a housing 3 for housing secondary batteries 2 at the center of the resin strap 1. The secondary batteries 2 are, for example, lithium ion batteries, nickel hydrogen batteries, or nickel cadmium batteries, etc. The charging terminal 4 for charging the secondary battery 2 is provided at the housing 3. The output terminal 5 for supplying electrical power to external portable electronic equipment is provided on the opposite side to the charging terminal 4. A gas release valve 6 for releasing gas that accumulates within the housing 3 is provided at a side of the housing 3.

Figure 10A:
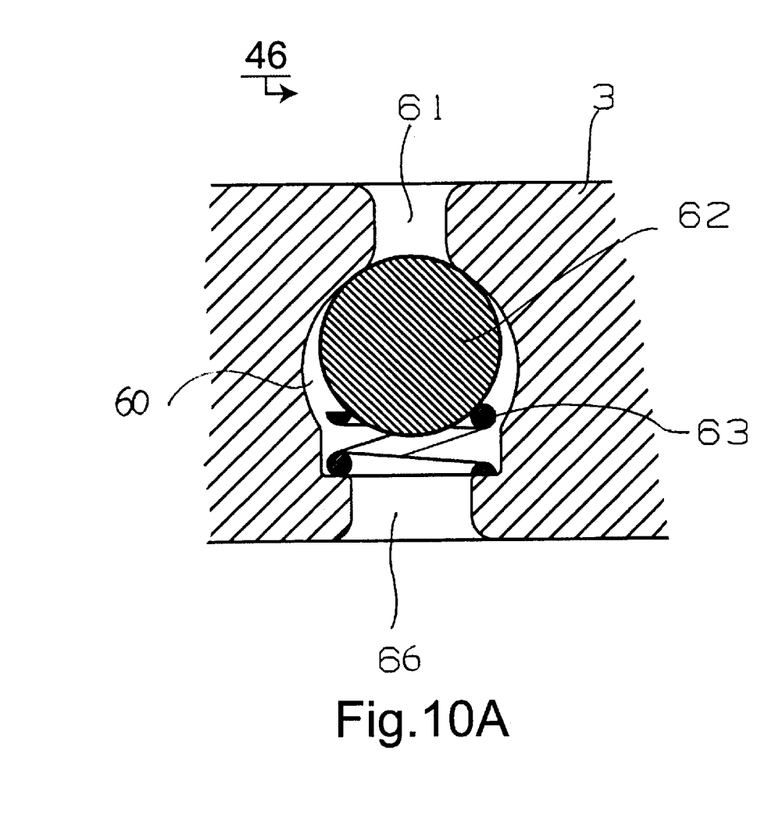
FIGS. 10A–10B are explanatory view showing the structure of the gas release valve shown in FIGS. 9.
Figure 10B:
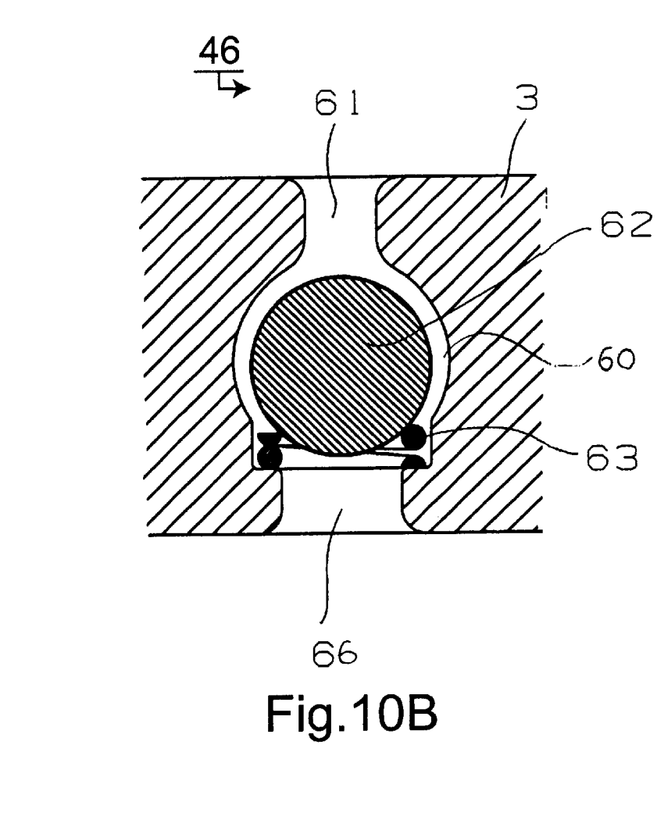

FIGS. 10A–10B are cross-sectional view of a structure for the gas release valve shown in FIGS. 9. As shown in FIG. 10A, this valve 46 comprises a gas introduction section 61 and a valve chamber 60 formed in the housing 3 made of a soft resin such as polyurethane, and a hard ball 62 and spring 63 for closing the gas introduction section 61. The hard ball 62 housed within the valve chamber 60 is usually repelled by the spring 63 so as to close the gas introduction section 61 and prevent the infiltration of sweat and water, as shown in FIG. 10A. When gas builds up in the housing 3 so that the pressure becomes high, the hard ball 62 is moved by this high pressure, as shown in FIG. 10B, and gas is released from the valve chamber 60 to the outside via an outlet 66. The spring 63 is adjusted so as to flex under a prescribed gas pressure.

Eighth Embodiment

Figure 11A:
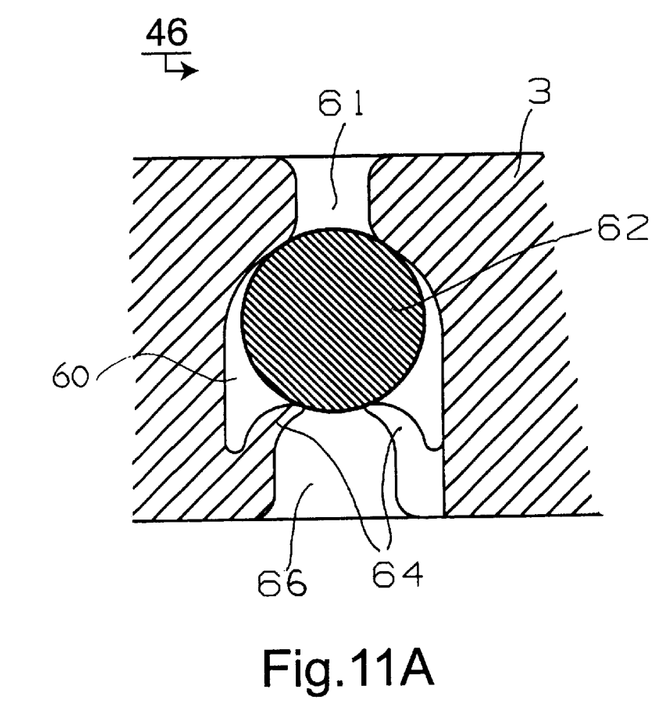
FIGS. 11A–11B are cross-sectional view showing a further valve structure for an eighth embodiment of a structure for an electronic equipment strap.
Figure 11B:
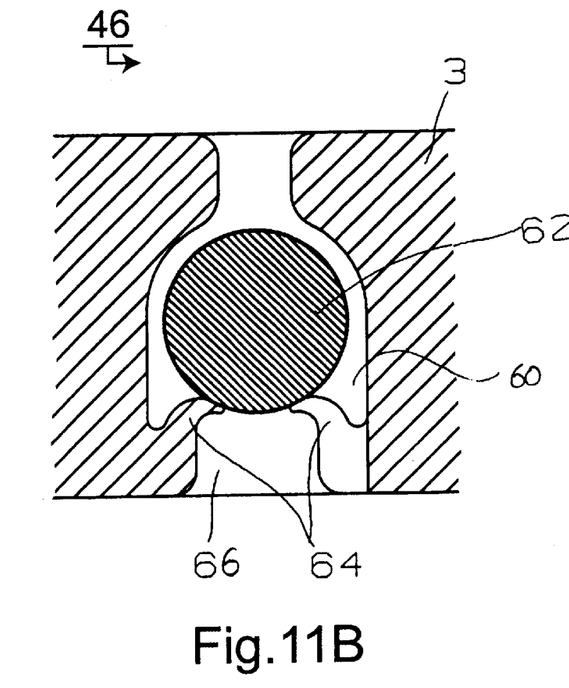

FIGS. 11A–11B are cross-sectional view of an eighth embodiment showing a further valve structure. This structure is substantially the same as the structure of FIG. 10, and comprises a gas introduction section 61 and a valve chamber 60 formed in the housing 3 made of a soft resin such as polyurethane, and a hard ball 62 for closing the gas introduction section 61. However, a spring 64 is integrally made of part of the housing 3, in place of the spring 63. The hard ball 62 housed within the valve chamber 60 is usually repelled by the spring 64 so as to close the gas introduction section 61 and prevent the infiltration of sweat and water, as shown in FIG. 11A. When gas builds up in the housing 3 so that the pressure becomes high, the hard ball 62 is moved by this high pressure, as shown in FIG. 11B, and gas is released from the valve chamber 60 to the outside via the outlet 66. The spring 64 is adjusted so as to flex under a prescribed gas pressure, and a notch for releasing gas is provided at at least one location at the spring 64.

Figure 12A:
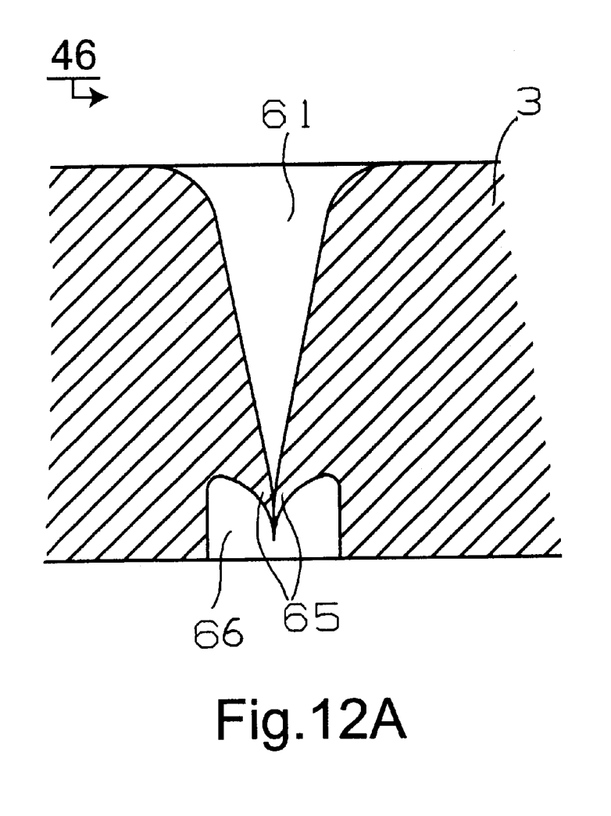
FIGS. 12A–12B are cross-sectional view showing a still further valve structure for a ninth embodiment of a structure for an electronic equipment strap.
Figure 12B:
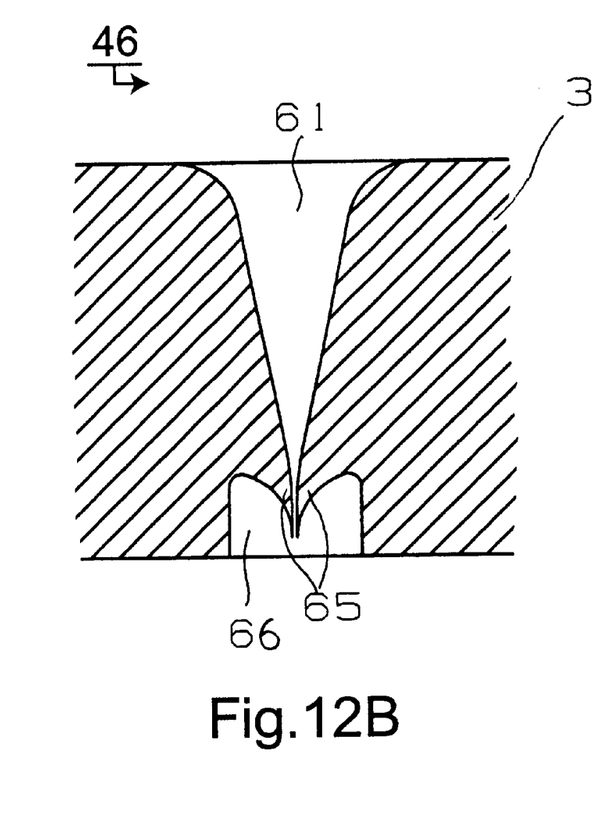

FIGS. 12A–12B are cross-sectional view of an ninth embodiment showing a further simplified valve structure. It is also possible to have a configuration that utilizes the housing 3 being made of a soft resin such as polyurethane where an elastic valve 65 has a gas introduction section 61 in a wedge-shape facing outwards. In this case, when the outer pressure and inner pressure is the same, the elastic valve 65 is closed due to the elasticity of the rubber. When gas is generated so that the inner pressure becomes high, tips of the valve 65 open up and gas is discharged to outside. The valve structure is by no means limited to that shown in FIGS. 10 to FIG. 12, and simplified structures are preferred. For example, a gate valve, cock, or diaphragm valve etc. can be employed rather than a check valve, with gas then being released manually.

As described above, according to the structure for a strap for portable electronic equipment of this invention, the following effects can be obtained.

Firstly, charging can be carried out from outside both easily and rapidly. Secondly, electrical power can be provided to other portable electronic equipment. Thirdly, economies can be made with regards to the number of parts and to space by employing an input/output terminal. Fourthly, overcharging of a secondary battery can be prevented by an overcharging prevention circuit. Fifthly, compatibility can be attained with portable electronic equipment of different voltages by changing the voltage using a voltage changeover switch. Sixthly, erroneous operation can be prevented by having the diameter of the terminals for the plurality of output terminals provided different diameters. Seventhly, infiltration of dust and sweat and short circuiting with the outside can be prevented by providing covers for the terminals.

According to the structure for a strap for portable electronic equipment of this invention, equipment can be made to fit in an extremely comfortable manner while maintaining a large power supply capacity because the strap as a whole can be made curved.

According to the structure for a strap for portable electronic equipment of this invention, a superior fit can be provided because a battery housing can be fixed at an arbitrary position. Further economies are also provided for because the strap is changeable. Battery changing can also be further simplified by providing the battery housing and the strap separately.

According to the structure for a strap for portable electronic equipment of this invention, a secondary battery is housed in part of a strap for carrying portable electronic equipment, and a gas release valve is provided in the portion housing this secondary battery. Deformation of the strap due to gas accumulating at the portion housing the secondary battery can therefore be prevented.

What is claimed is:

1. A wrist strap for a wrist-wearable electronic device, comprising: a flexible strap connectable to a housing of the wrist-wearable electronic device; a secondary battery for driving the electronic device connectable to a portion of the strap separately from the wrist-wearable electronic device; a charging terminal for connecting an external charger to the secondary battery provided on the strap; electrode wires embedded in the flexible strap for providing electric power; a plurality of slots formed in the flexible strap exposing a surface of the electrode wires; and a detachable battery housing for housing the secondary battery provided with electrode projections for connecting the secondary battery to the electrode wires through the slots.

2. A wrist strap according to claim 1; further comprising a removable cover disposed at the charging terminal.

3. A wrist strap according to claim 1; further comprising an overcharging prevention circuit provided in the strap for detecting overcharging of the secondary battery.

4. A wrist strap according to claim 1; further comprising an output terminal provided on the strap for connecting an external electronic device to the secondary battery.

5. A wrist strap according to claim 4; further comprising a voltage changeover switch connected to the output terminal for selecting among different voltages to be output from the output terminal.

6. A wrist strap according to claim 1; further comprising a plurality of output terminals provided on the strap for connecting an external electronic device to the secondary battery, the output terminals for outputting different voltages and having different terminal diameters.

7. A wrist strap according to claim 6; further comprising removable covers disposed at the output terminals.

8. A wrist strap according to claim 1; wherein the detachable battery housing has a curved structure conforming to a curvature of a user's wrist, and the secondary battery comprises a plurality of secondary batteries having a curved structure conforming to the curvature of the housing, the secondary batteries being disposed in the housing.

9. A wrist strap according to claim 1; wherein the detachable battery housing has a curved structure conforming to a curvature of a user's wrist, and the secondary battery has a curved structure conforming to the curvature of the housing and is disposed within the housing.

10. A wrist strap according to claim 1; wherein a position of the detachable battery housing is adjustable by positioning the electrode projections through desired ones of the slots.

11. A wrist strap according to claim 10; wherein the electrode wires extend longitudinally across the strap in rippled manner.

12. A wrist strap according to claim 1; further comprising a gas release valve provided in the housing.

13. A wrist strap according to claim 1; wherein the charging terminal comprises an input/output terminal connected to the secondary battery and provided in an exposed manner on the strap for connecting an external charger to charge the secondary battery and for outputting power from the secondary battery to drive an external device.

14. A portable electronic device comprising: a wrist-wearable electronic device; a battery for driving the wrist-wearable electronic device; a strap on which the wrist-wearable electronic device and the battery are separately disposed, the battery being detachable from the strap; an electrode wire extending through the strap to connect the battery to the wrist-wearable electronic device; and an electrode for connecting the battery to the electrode wire; wherein a hole is formed in the strap to expose the electrode wire, and the electrode connects the battery to the electrode wire through the hole.

15. A portable electronic device according to claim 14; wherein the hole comprises a plurality of holes, and the position of battery on the strap is adjustable using the holes.

16. A portable electronic device according to claim 14; wherein the electrode wire has a wavering shape in a part of the strap that is curved when the device is mounted on a user's wrist.

* * * * *